(12) United States Patent
Nocera et al.

(10) Patent No.: US 7,014,469 B1
(45) Date of Patent: *Mar. 21, 2006

(54) METHOD FOR DEVELOPING ANSWER-OPTIONS TO ISSUE-QUESTIONS RELATING TO PERSONAL FINANCE AND INVESTMENT

(76) Inventors: Tina M. Nocera, 66 Union Ave., Nutley, NJ (US) 07110; Catherine S. Banat, 333 W. End Ave., Apt. 12 B, New York, NY (US) 10023; Sarah C. Lee, 114 Liberty St., 7th Floor, New York, NY (US) 10006

( * ) Notice: Subject to any disclaimer, the term of this patent is extended or adjusted under 35 U.S.C. 154(b) by 285 days.

This patent is subject to a terminal disclaimer.

(21) Appl. No.: 09/723,402

(22) Filed: Nov. 28, 2000

Related U.S. Application Data (63) Continuation-in-part of application No. 09/197,156, filed on Nov. 20, 1998, now Pat. No. 6,193,518.

(51) Int. Cl.
  G09B 19/00 (2006.01)
  G09B 3/00 (2006.01)
  G09B 7/00 (2006.01)
  G06F 17/60 (2006.01)

(52) U.S. Cl. .................. 434/236; 434/322; 705/36; 705/35; 705/37

(58) Field of Classification Search .............. 705/1, 705/2–40; 434/362, 236–238, 322
See application file for complete search history.

(56) References Cited

U.S. PATENT DOCUMENTS

| | | | | |
|---|---|---|---|---|
| 5,035,625 A | * | 7/1991 | Munson | 434/332 |
| 5,820,386 A | * | 10/1998 | Sheppard, II | 434/322 |
| 5,842,221 A | * | 11/1998 | Schmonsees | 707/104.1 |
| 6,014,658 A | * | 1/2000 | Pretz | 707/2 |
| 6,026,148 A | * | 2/2000 | Dworkin et al. | 379/88.18 |

(Continued)

FOREIGN PATENT DOCUMENTS

JP     02002351303 A  * 12/2002

(Continued)

OTHER PUBLICATIONS

The Motley Fool, Fool.com; Finance and Folly, www.fool.com, main home page, 2 pages, © 1995-2001 The Motley Fool.

(Continued)

*Primary Examiner*—Vincent Millin
*Assistant Examiner*—Narayanswamy Subramanian
(74) *Attorney, Agent, or Firm*—Ernest D. Buff & Associates, LLC; Ernest D. Buff; Margaret A. LaCroix (57) ABSTRACT

Information concerning personal investment and finance is developed and stored in first and second data sets containing topics and issue-questions related thereto. The information is accessed from these data sets by selectively combining an issue-question with at least one topic to produce a primary information product. A program means associated with the data sets modifies the primary information product by imposing thereon a plurality of answer-options to the selected issue-question. Each answer-options comprises at least one expert opinion and at least one prudent-investor opinion, stored in third and fourth data sets. The imposition of answer-options on the information product produces a polycentric information product, which is readily communicated by oral, written or electronic means. Advantageously, the method provides to a user a range of focused responses to an investor's questions in a time-efficient manner in order for investors to make prudent investments given their priorities and personal preferences.

27 Claims, 3 Drawing Sheets

U.S. PATENT DOCUMENTS

| | | | | |
|---|---|---|---|---|
| 6,154,732 | A * | 11/2000 | Tarbox | 705/36 |
| 6,236,975 | B1 * | 5/2001 | Boe | 705/7 |
| 6,349,290 | B1 * | 2/2002 | Horowitz | 705/35 |
| 6,393,423 | B1 * | 5/2002 | Goedken | 707/10 |
| 6,480,698 | B1 * | 11/2002 | Ho | 434/362 |
| 6,564,226 | B1 * | 5/2003 | Dickson et al. | 707/104.1 |
| 6,629,096 | B1 * | 9/2003 | Reddy | 707/5 |
| 6,766,320 | B1 * | 7/2004 | Wang et al. | 707/5 |
| 6,804,670 | B1 * | 10/2004 | Kreulen et al. | 707/7 |

FOREIGN PATENT DOCUMENTS

| | | | |
|---|---|---|---|
| JP | 02003036308 A | * | 2/2003 |

OTHER PUBLICATIONS

InvestorGuide.com—The Leading Online Guide to Investing, www.investorguide.com, main home page, 2 pages, © 1996-2001 InvestorGuide.com.

Money.com, www.money.com/money, main home page, 2 pages, © Time Inc.

Associated Bank, Wealth Management, 1 page, © 2001 Associated Banc-Corp. www.assocbank.com/WealthManagement/BrokeragePersonalInvestmentServices/.

Mellon Financial Markets, LLC—Personal Investmetn Sales, 1 page, © 2001 Melon Financial Corporation. www.melon.com/inst/mcf/mfm/personalinv/.

Working Woman.com; Making a Personal Investment, 3 pages, © 2000 Working Woman Network, Inc. www.workingwoman.com/wwn/article.jsp?contentId=708&ChannelId=209.

Investopedia.com—The Investing Education Site, www.investopedia.com, main home page, 2 pages, © 2001, Investopedia.com.

CharlesSchwab, www.schwab.com, main home page, 1 page, © 2001 Charles Schwab & Co., Inc.

MultexInvestor from Multex.com, www.marketguide.com/home.asp, main home page, 3 pages, © 2001 Multex.com.

E*TRADE, www.etrade.com/cgi-bin/gx.cgi/AppLogic+Home, main home page, 2 pages, © E*TRADE Securities, Inc.

TheStreet.com: Personal Finance, www.thestreet.com/funds/, main home page, 3 pages, © 1996-2001 TheStreet.com, Inc.

Wall Street City, by Telescan, Inc., www.wallstreetcity.com/tools/tools_main.html, ProSearch, 2 pages, © 2001 Telescan, Inc.

AskMen.com Men's Magazine, www.askmen.com, main home page, 2 pages, © 1999-2001 AskMen.com Ltd.

CBS MarketWatch.com, cbs.marketwatch.com/news/default.asp?siteID⇋mktw, main home page, 4 pages; Personal Finance, 4 pages, © 1997-2001 MarketWatch.com, Inc.

Ameitrade, www.ameritrade.com, main home page, 1 page, © 1996-2001 Ameritrade, Inc.

CSFB Direct, www.csfbdirect.com, main home page, 1 page, © 2001 CSFBdirect Inc.

Datek Online, www.datek.com, main home page, 1 page, © 2001 Datek Online Financial.

Fidelity.com, www.300.fidelity.com, main home page, 1 page, © 2001 FMR Corp.

Merrill Lynch, www.ml.com, main home page, 1 page, © 2001 Merrill Lynch.

Morgan Stanley Online, www.online.msdw.com, main home page, 2 pages.

National Discount Brokes, www.ndb.com.ndbhomepage.html, 2 pages, © 2000 national Discount Brokers Corporation.

TD Waterhouse, www.tdwaterhouse.com, main home page, 2 pages; Get Started, 1 page. © 2001 TD Waterhouse Investor Services, Inc.

* cited by examiner

METHOD FOR DEVELOPING ANSWER-OPTIONS TO ISSUE-QUESTIONS RELATING TO PERSONAL FINANCE AND INVESTMENT

CROSS-REFERENCE TO RELATED APPLICATIONS

This application is a continuation-in-part of U.S. application Ser. No. 09/197,156, filed Nov. 20, 1998, now U.S. Pat. No. 6,193,518.

BACKGROUND OF THE INVENTION

1. Field of the Invention

The present invention relates to information systems for creating and distributing syndicated content; more particularly, to a database of questions and answers covering a myriad of personal finance and investment topics in a broadly accessible virtual manual format.

2. Description of the Prior Art

In today's complex world, individuals face a myriad of financial issues: budgeting income; being adequately insured; establishing and maintaining sound credit; saving and investing for their own retirement; planning their estate; and saving for a variety of life goals. These financial challenges are not restricted to those having more limited monetary means—they exist along the entire socio-economic continuum. In a March 2000 Gallup poll, women ranked financial issues as the most pressing personal concern in their lives—ahead of family, health, time and stress, and equal rights.

Investors presently have more investment options and more responsibility for their retirement accounts. A menu of 401 k plans, IPOs, UGMA plans, and IRAs has become part of our daily experience. Investment periodicals, television shows, and newspaper articles add to our barrage of financial-information overload, and history's longest-lasting bull market has lured many to hope and expect instant riches. Ads and seminars promise extraordinary profits—sometimes promoting speculative, risky schemes. Financial anxiety, financial illiteracy, and financial ill-preparedness are not new issues.

The financial services industry has increasingly recognized the need for people to successfully manage their personal finances. Financial information and advice is presently available on a broad spectrum of topics distributed in many different mediums. As the availability of research data and financial information increases, especially for those with an Internet connection, the average investor is subjected to financial information overload. Another problem presented by the overwhelming quantum of such information is the tendency for presentation of singular points of view, typically the author's or the brokerage firm for which the author works. Literature references which are comprehensive enough to address the numerous issues important to individuals, and which offer a variety of views on these important issues are virtually non-existent owing to the myriad of variables involved in financial planning.

There remains a need in the art for a method and means for providing individuals with access to multi-facetted points of view for the personal finance and investing issues that are most important to them. Presently, most financial advice comes from a firm having a particular viewpoint or the intention to promote a particular product. There are few sources that offer help for educational purposes only, and those that do, provide polarized opinions on the subject. Yet, who can predict with certainty whether the stock market will rise or fall? The value of a stock purchase recommendation resides in the analysis and a comparison thereof with explanations provided by those with differing views. Financial decisions are generally based on opinions, not clear facts. Individuals would benefit significantly from a financial information source that provides a broad spectrum of views, sets forth the rationale for the opinion or the recommendation reached, and applies the rationale to specific fact patterns having particular relevance to salient factors affecting investment decisions.

SUMMARY OF THE INVENTION

The present invention provides a method for providing to a user answer-options to issue-questions relating to personal finance and investment. In one aspect, the method comprises the steps of (1) identifying a plurality of topics relating to personal finance and investment based upon predetermined criteria; (2) developing and recording a plurality of issue-questions directed to each of the identified personal finance and investment topics; (3) developing and recording an expert opinion for each issue-question; (4) developing and recording a reasonable-investor opinion for each issue-question; (5) selecting a topic; (6) selecting an issue-question directed to the selected topic; and (7) communicating a plurality of answer-options to the selected issue-question, the plurality of answer options comprising at least one expert opinion and one prudent-investor opinion and being communicated in writing, or electronically. The present invention may be used with or without the aid of a general-purpose computer.

In another aspect of the present invention, there is provided a method comprising the steps of (1) identifying a plurality of topics relating to personal finance and investment based upon predetermined criteria; (2) developing and recording a plurality of issue-questions directed to each of the identified personal finance and investment topics; (3) developing and recording a plurality of expert opinions for each issue-question; (4) selecting a topic; (5) selecting an issue-question directed to the selected topic; and (6) communicating a plurality of expert answer-options to the selected issue-question, the plurality of answer-options comprising at least two expert opinions that are substantially diverse and being communicated orally, in writing, or electronically.

In yet another aspect of the present invention, information concerning personal finance and investment is developed and stored as at least one database (obviously, more than one database may also be used in connection with the present invention) in a memory storage device of a general purpose computer as first and second data sets containing topics and issue-questions related thereto. The information is accessed from these data sets by selectively combining an issue-question with at least one topic to produce a primary information product. A program means associated with the data sets modifies the primary information product by imposing thereon a plurality of answer-options to the selected issue-question. Each of the answer-options comprises at least one expert opinion and at least one prudent-investor opinion stored in a third and fourth data set. The imposition of answer-options on the information product produces a polycentric information product, which is readily communicated to the investor-user of the present invention by oral, written or electronic means.

Advantageously, when practicing the method of the invention, the user benefits from the various views of the experts and prudent-investors, and can consider the answer-options provided in direct, focused response to the specific issue-question that the user has identified as being important. This tailored response is highly advantageous to a specific user or audience such as investors, members of investment clubs and others interested in managing their personal finances in that it filters out extraneous information, and provides focused guidance in the form of answer-options in a highly efficient manner. Through consideration of numerous variables, the method of the present invention serves to (i) identify the topics most important to a specific user; (ii) prioritize these topics; and (iii) develop specific issue-questions and answer-options directed to each of the prioritized topics. Such a multi-faceted approach provides both professional (expert) and practical (prudent-investor) advice in the form of a polycentric, response tailored to a specific issue-question.

BRIEF DESCRIPTION OF THE DRAWINGS

The invention will be more fully understood and further advantages will become apparent when reference is made to the following detailed description of the preferred embodiments of the invention and the accompanying drawings wherein.

DESCRIPTION OF THE PREFERRED EMBODIMENTS

The present invention is directed to a method of providing a variety of answers to the numerous questions and issues related to personal finance and investment. The present invention may be tailored to a specific user or audience, for example, parents of young children, retirees, baby-boomers, etc. The present invention can identify the topics most important to a specific user, prioritize these topics, and develop specific questions directed to each of the prioritized topics. The specific questions or issue-questions, are then presented to a panel of experts including CFAs/CFPs, market equity analysts, SEC registered brokers/salespeople/traders, economists, and bankers, and the like, to elicit answers from each expert for each issue-question. The issue-questions can also be presented to a panel of prudent-investors, referred to herein as "prudent-investors", who each offer their opinion to the issue-question based on personal experience. The result is a plurality of perspectives or answer-options directed to each issue-question that are communicated to the user. The answer-options are preferably comprised of at least one expert opinion and at least one prudent-investor opinion. In an alternate embodiment, the answer-options comprise at least two expert opinions having a substantial degree of diversity. The user thus benefits from the various views of the experts and prudent-investors or, in the case of the alternate embodiment, from the divergent views of diverse experts, and can consider the answer-options provided in addressing the specific issue that the user has identified as being important (based upon market research and other statistically gathered data).

The present invention may be used for production of a product series that includes, but is not limited to, television shows and video-tapes, CD-ROMs, computer-based training ("CBT") products, print publications including a newsletter, web pages (i.e., the world-wide web), and other now available or hereafter developed communication media and technology.

As used herein, the term "investor" refers to sole or joint investors, members of investment clubs, and other persons interested in management of their personal finances. The term "prudent-investor" refers to persons identified as having actual hands-on, practical experience with specific financial investment issues, situations, and the like, regardless of whether that person is actively and regularly engaged in investment matters, or maintains an active portfolio of investment properties. The term "expert", as used herein, means a person qualified to advise or represent other persons or entities concerning financial matters, and actively and regularly engaged for consideration in the personal finance and investment industry. The terms "user", "investor", "user-investor" and "viewer" are used herein to identify persons benefiting from the present invention.

Figure 1:
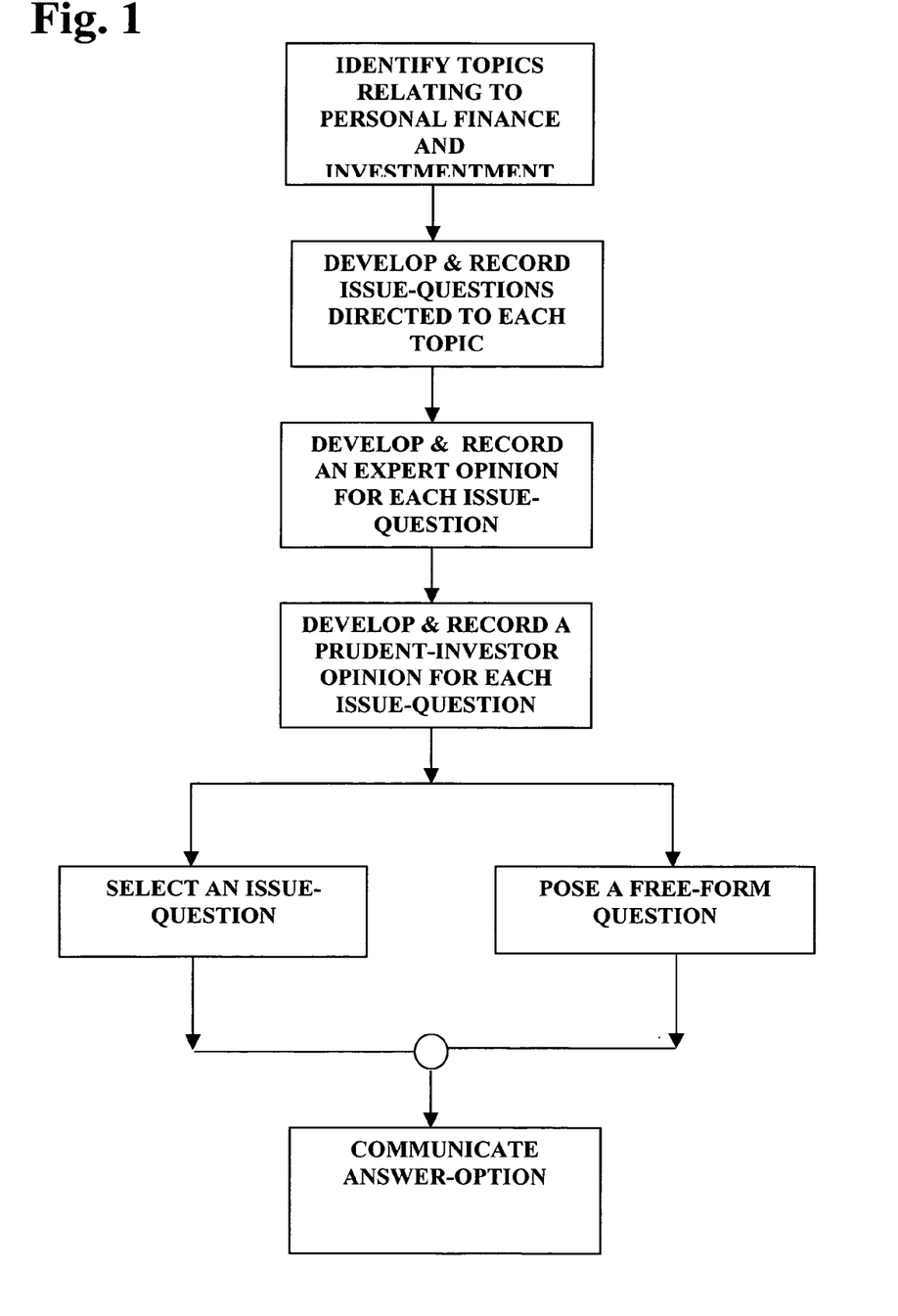
FIG. 1 is a flow diagram of the method of the present invention.

Referring FIG. 1 of the drawings, there is shown a flow diagram of a preferred embodiment of the present invention. A specific group of topics relating to personal finance and investment are first identified. The topics may include: (1) estate planning, (2) banking, (3) college planning, (4) insurance, (5) investing—technical analysis, mutual funds, specific fixed income and equity investments, asset allocation, (6) mortgages, (7) credit, debt and bankruptcy, (8) retirement planning—IRAs/Keogh, (9) real estate, (10) trust planning—UGMA, (11) tax planning, (12) car finance, and (13) using brokers, financial planners, insurance agents. It will be obvious to persons skilled in the art that these topics are merely illustrative, and that the topics considered by the present invention are limited only by the imagination of a routineer in the art. The group of topics may be identified using surveys of families, baby boomers, retirees, college students focus groups, statistical data (i.e., data gathered by a third party directed to personal investment and finance and various other information and data gathering sources and means.

Once the group of topics is identified, specific issue-questions directed to each topic are developed. These issue-questions may be developed using sources and means similar to those used for identification of the topics described above. The specific issues an intended audience will have for the various topics depends on factors such as audience composition (i.e., retiree, young family etc.), location (i.e., city, suburb, country, etc.), socioeconomic class, and other factors. Thus, the specific questions must be developed by considering these and other variables so that the information provided by the present invention in the way of answer-options (described in more detail below) is meaningful and useful for the desired target audience, whether it be a college student, retiree, young business professional or whomever.

The issue-questions are then presented to a panel of experts in the investment community. The panel may include CFAs/CFPs, market equity analysts, SEC registered brokers/salespeople/traders, economists, bankers, and other professionals having financial investment experience and knowledge. Each expert provides an answer to the issue-question, thus providing a plurality of theoretical expert opinions as answer-options on the specific issue-question. Providing various perspectives on a single subject that is particularly important to the intended audience as previously identified by the development of topic groups and issue-questions, has heretofore not been available from a single source, as is the case with the present invention. Previously, persons having interest in learning more about personal investment and finance questions must consult numerous sources of information to obtain the same quantum of information as provided by the present invention. In addition, current information sources lack objectivity since most financial information providers have a product or service to sell. Further, the information generated as answer-options to issue-questions in accordance with the present invention is specific, and focused, in that it primarily addresses those issues identified as being the most important to the target audience.

The issue-questions are also presented to a panel of prudent-investors, herein referred to as "prudent-investors", who bring their real-life, hands-on, practical experience to bear on the issues most important to the audience. Each of the prudent-investors provides an opinion on the issue-question; collectively, the prudent-investors provide a diverse variety of views and perspectives as answer-options on each issue-question. Thus, the expert panel provides primarily theoretical views and the prudent-investors provide primarily practical views on the questions and issues identified as most important by the target audience. The opinions of the expert panel and prudent-investors are provided as a plurality of answer-options that may be considered by the audience or user.

For the broadcast, videotape and DVD media, the issue-questions can be presented to the expert and prudent-investor panels in the form of a question and answer interchange conducted by a moderator. The experts and prudent-investors can individually respond to the issue-question thus providing a plurality of answer-options that expose the audience to a plurality of views on a question that has particular relevance and importance to them. This question and answer format can be repeated until the topic is thoroughly explored.

Figure 3:
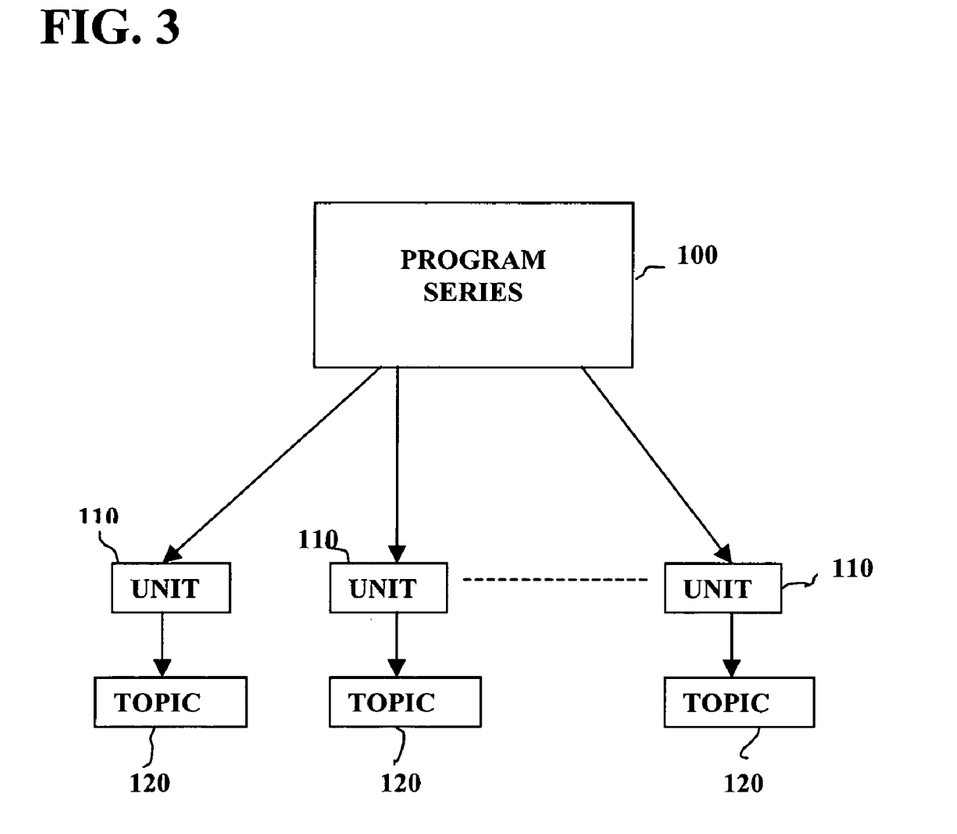
FIG. 3 is a block diagram of the components of a program series developed in accordance with the method of the present invention.

In a preferred embodiment, and with reference to FIG. 3, the present invention is used in the development of a program series 100 that can be broadcast on radio, television, cable, pay-per-view, and the like, downloaded to wireless devices such as personal digital assistants (PDAs), recorded on video-tape or digital-video disk (DVD), or stored on CD-ROM for use on a general purpose computer. The program series 100 includes a number of individual program units 110, with each program unit 110 addressing a specific topic 120 and fully exploring a broad range of issue-questions directed to that topic 120. For this embodiment, a program series 100 developed in accordance with the present invention will be comprised of a plurality of program units 110, each directed to a specific, single topic 120. Alternatively, the program series 100 may be comprised of a plurality of program units 110 that address a number of topics.

In a most preferred embodiment, the present invention is used in connection with the development and production of a television (network, cable, or otherwise) program format that regularly provides the described specific information. An example of a typical program topic is Internet IPO Investment Risks. Issue-questions concerning the topic are posed to guests on the show who are professional and practical consultants. The live audience votes on the responses to issue-questions offered by the consultants using a keyboard device, via telephone call in, or other well-known methods.

Figure 2:
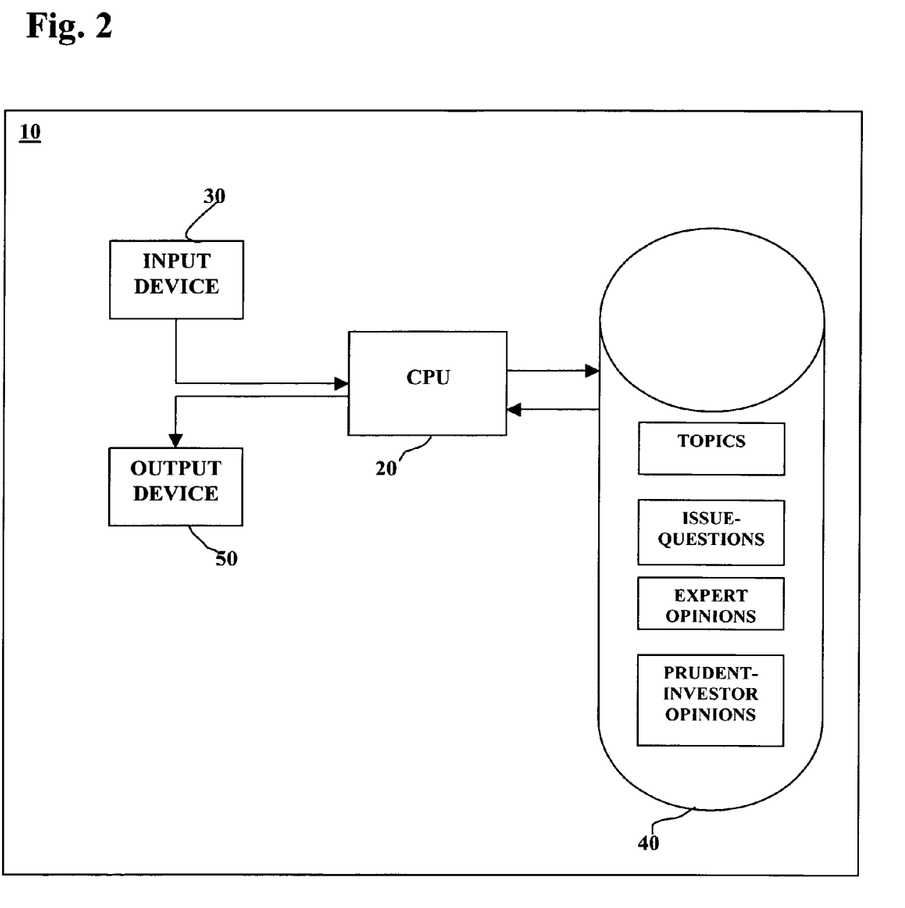
FIG. 2 is a block diagram of a general purpose computer on which the present invention may be operated.

For non-broadcast mediums such as CD-ROM and CBT, the present invention operates in connection with and on a general-purpose computer 10, as depicted in FIG. 2. The computer 10 has a processor including a central processing unit (CPU) 20, an input device 30 such as a keyboard or mouse (including those integrally provided with laptop computers), a memory storage device 40 such as a hard disk unit (HDU), random access memory (RAM), or CD-ROM, and an output device 50 such as a computer monitor, printer, or modem. While the present invention operates in connection with and on a general-purpose computer, it will be obvious to persons skilled in the art that the computer 10 in connection with which the present invention is used may contain additional components and peripheral devices.

Once the topic groups are identified, they are stored in the computer memory, preferably in a database on the HDU or CD-ROM. The issue-questions are also stored on the HDU or CD-ROM. The issue-questions are still presented to the expert panel and to the prudent-investor panel to develop the various answer-options (i.e., plural, oftentimes substantially diverse opinions) on the issue-questions. These answer-options are recorded and also stored in a database on the HDU or CD-ROM. Using the input device 30, a user of the present invention first selects a specific topic from a list of topics, and then an issue-question from a list of "frequently asked questions" (i.e., FAQs) directed to the selected topic. The computer 10 retrieves the expert opinions and prudent-investor opinions for the selected issue-question and communicates these opinions to the computer output device 50 as answer-options for consideration by the user. The user may then select another topic, or another issue-question directed to the previously selected topic. The answer-options may be presented in a variety of formats including text only, text and non-animated graphics, text and animated graphics, text and video, video and audio, and various other formats.

Obviously, not every user is interested in the same topics and questions. Issues important to a retiree will not be the same issues that are important to a young professional. The present invention provides an input mask that consists of criteria entered by the user and that identifies the specific needs and interests of that particular user. The input mask will consider the criteria and operate as a filter or overlay to the various data stored in the database. Thus, user-specific information can be retrieved to provide an information product in the form of answer-options that are directed specifically to the user. Information entered by the user, including the user's age and geographic location, are used to comprise the input mask so that only information directed to the specific user's personal and finance investment needs are provided. The user may also select which answer-options should be provided, e.g., all answer-options, substantially diverse experts only, prudent-investors only, etc. Thus, the information product provided by the present invention is customizable by the user and may be tailored to address those issues identified by the user as the most important. The user may enter criteria for the input mask either before or after selecting a specific issue-question.

While the user may identify a specific issue, he/she may not know what questions to ask. The input mask of the present invention may operate as a query tool to assist the user in identifying specific questions. For example, a young professional may query issues involved in obtaining life insurance. The answer-options for this user are distinctly different than those for the retiree. Thus, the user can enter selection criteria as a variable criterion for the input mask and the present invention will consider this information when querying the stored information (e.g., issue-questions, diverse expert opinions and prudent-investor opinions) to retrieve only that information directed to this specific user's concern with an investment need.

As an alternative to selecting an issue-question, the user may also submit a free-form question in ordinary English or other languages specified. This method is more convenient for the user who may have difficulty identifying appropriate keywords for a search. Another advantage of this approach is that retrieval results using the present invention can be more relevant than those generated by well-known keyword matching techniques. These techniques simply scan text to identify keywords and retrieve documents that contain the keywords.

The present invention resolves the problem posed by conventional keyword scan and matching techniques, and enables the user to enter a free-form question, by using a contextual search engine. In a preferred embodiment, the user enters a free-form question, by using a combination of Bayesian inference and information theory to determine the context of the question asked and to use this derived context to generate an appropriate topic or issue-question.

Bayes' theorem gives the rule for updating belief in Hypothesis H (i.e. the probability of H) given additional evidence E, and background information (context) I. In other words, Bayes' theorem reasons back from events to causes. We can derive the probability of a particular cause, given the probability of a particular effect.

This is expressed by the equation:

$$p(H|E,I)=p(H|I)*p(E|H,I)/p(E|I)$$

The left-hand term, p(H|E,I) is called the posterior probability, and it gives the probability of the hypothesis H after considering the effect of evidence E in context I. The p(H|I) term is just the prior probability of H given I alone; that is, the belief in H before the evidence E is considered. The term p(E|H,I) is called the likelihood, and it gives the probability of the evidence assuming the hypothesis H and background information I is true. The last term, 1/p(E|I), is independent of H, and can be regarded as a normalizing or scaling constant. The information I is a conjunction of (at least) all the other statements relevant to determining p(H|I) and p(E|I). New pieces of evidence can be factored into the calculation. As each new piece of evidence is factored in, its effect is conditional on all the previously considered evidence.

The context search engine in the processor of the present invention applies Bayes' theory to identifying the context of a free form question. The engine treats words within the question as abstract symbols with mathematical relationships based on probability. When the search engine identifies a cluster of related words, it also derives the probability that the "cause" or reason for the cluster, is the presence of a particular context.

The context search engine also "spiders" web sites with the same focus as the identified issue-question. Spidering supplies the user with a deeper and richer answer-option, that the user can peruse, based on the user's individual interest. The themes identified in spidered documents are also used to generate categories for the documents, providing a directory of hyperlinks.

Use of the foregoing methods will occasionally retrieve answer-options some of which may be at odds with a user's investment objectives. These answer-options are not useful or could prevent achievement of investment goals. In one embodiment, in order to retrieve answer-options which are most in accord with a user's investment goals, an investment profile is developed for the user. This is accomplished by asking questions which reveal those investment issues of importance to the user. A sample question would be:

Which of the following statements best describes your feeling about investment risk?
  i. I don't want to lose my original investment and would only select investments that have a low degree of risk. I may have a small percentage in others that have a higher degree of risk that may yield greater returns.
  ii. I prefer a balanced mix (50 in low risk and high risk)
  iii. I want an aggressive mix of investments—with an emphasis on investments that have a higher degree of risk that may yield greater returns.
  iv. I am looking for a big payoff and will take a high degree of risk for a high return.

Based on the user's answers, the user's investment goals can be discerned. Because answer-options are also coded to indicate the preferences they reflect, answer options reflecting the user's preferences can be identified, and only these are displayed to the user. For example if a user chooses the answer 'A', the user would be coded "C" for Conservative and would only see opinions that were also coded "C" and reflected this preference.

In addition the current invention also filters answer-options so that clearly different choices are presented to the user. For example, the question "I'm a retiree and am thinking about investing in IPOs of Internet companies. Is this too risky?" could evoke the following answer options:
  a. Speculative equity plays should not be considered for short term investments.
  b. Retirees may like the gamble but unless the total investment can be lost without blinking an eye, Internet IPOs are best left to other investors.

For all intents and purposes, these answer-options are identical in content. The current invention identifies answer-options that are very similar or identical, and only displays one of them. In this way, the user is always provided with at least three opinions, practical and professional, which state significantly different points of view and the user's time is not wasted viewing duplicate answers.

In a first process, a copy-editor scans the answer-options, and based on a set of predetermined criteria, identifies very similar answer-options as duplicate answers. For example, all answer-options which instruct the user-investor to not invest in Internet IPOs are identified as duplicate answers. Only one of the duplicate answers is displayed.

Similar answers can differ as to tone or suggestions offered and manual overview provides the ability to identify these significant subtleties. For example, given the following question, "At 29 years, I am a beginner investor and am very cautious. I have just put 50% of my money into a long-term bond fund and 50% into a money market fund. Is that a prudent investment strategy?" Three of the four respondents expressed that a more aggressive strategy made more sense. However even at the summary level the answer-options vary considerably, as indicated below.

Response 1: Your portfolio should be weighted heavily into equities. I would suggest 75% into some sort of major market index, e.g. S&P fund and 25% in a municipal bond fund.

Response 2: I'll assume you need 50% in money market to keep liquid and because you're cautious. Take the remaining 50% and spread it over several stocks of blue chip companies that you like.

Response 3: At your age, consider an aggressive growth strategy for at least 50% of your portfolio. Invest in funds where you see potential for the future, e.g. technology, biotechnology. Liquidity is not your issue now . . . growth is.

For many questions, it is not be possible to immediately provide a set of answer options. This is particularly the case where questions are highly specific and therefore, could not have been anticipated. An exception report identifies all questions without answer-options as well as answers that have not been approved for display due to error, inappropriateness, or other problems. All questions are date/time stamped. Unanswered questions are submitted to consultants in accordance with an on-call schedule. Via email, consultants are notified of the date/time return requirements for the answers.

Consultants respond to the questions via email within a reasonable time period after a question has been submitted. Typically, the time period for consultant responses to questions submitted is about one second to 70 hours, more preferably about 1 hour to 60 hours and even more preferably about 10 to 50 hours, and most preferably about 30 to 40 hours. The responses are staged, i.e. sorted in order of time submitted with the oldest being addressed first, and reviewed by a team of copy editors for grammatical and other errors. The reviewed responses are then loaded into the database.

Within a reasonable time after a question has been submitted, as defined in the preceding paragraph, the user receives an email containing a link. The link reconnects the user to the original site and notifies the user that answer-options to the user's question are presently available on the site.

Although not yet available, interactive television will provide another medium for the implementation of the present invention. Interactive television will provide a means by which viewers can interactively pose questions to the experts and to the prudent-investors, who will, in turn, provide a plurality of answer-options in the form of their respective opinions on the issue-question. In this way, information provided by the present invention is specifically directed to the viewer, significantly increasing its relevance, importance, and preference.

Information provided in accordance with the present invention may also be communicated via a customized newsletter. Specific information is used to provide to the user information specifically directed to issues for that particular user's personal finance and investment interests. The newsletter also includes the numerous opinions of the experts and prudent-investors that provide various answer-options to the user. As discussed hereinafter in greater detail, the newsletter response forms, in effect, a composite opinion containing both professional and prudent-investor advice components that are polycentric and tailored to the specific issue-question presented by the user.

By taking into account the variables that determine which topics and issues are most important to the investor such as, location (i.e., city, suburb, country, etc.), socioeconomic class of the investor.), and by considering these variables when identifying the topic groups and issue-questions, the present invention provides a method of providing information to a user, viewer, etc. that is specifically directed to their immediate and pressing concerns. In other words, the information provided by the present invention is tailored to its audience. Information of this specificity has heretofore been unavailable. Significantly, the information provided by the present invention is polycentric, in that it provides numerous viewpoints (i.e., answer-options) on the topics and issues that have been identified as being most important to the target audience.

Over time, as the database continues to grow and content in all topic areas becomes substantial. As a result, content related to insurance, estate planning, and tax planning may be extracted to form separate content databases that will be licensed to niche and affinity groups. These self-generating databases will supply ready-made content, at far less cost, than hiring a copy-editor to provide the content. In this way, the current method and system provides a dynamic, growing database that is self-adapting, and continually developing facility for furnishing answer-options to issue-questions in content areas tangential to personal finance or even unrelated to the topic. For example, retirees, aging baby boomers, and investors are affinity groups who will also be served by the present invention. These groups share the same need as investors for customized advice.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. A method of providing to a user a plurality of answer-options to an issue-question relating to personal finance and investment, in a computer having a processor, an input device, a memory storage device and an output device, said method comprising the steps of:
   (a) identifying and storing in the memory storage device a plurality of topics relating to personal investment and finance;
   (b) developing and storing in the memory storage device a plurality of issue-questions directed to each of the stored topics;
   (c) developing and storing in the memory storage device an expert opinion for each issue-question;
   (d) developing and storing in the memory storage device a prudent-investor opinion, said opinion being from persons having actual, hands-on, practical experience with specific financial issues, situations and investment issues, regardless of whether that person is actively and regularly engaged in investment matters, or maintains an active portfolio of investment properties, for each issue-question;
   (e) selecting, by the user via the input device, a topic;
   (f) selecting, by the user via the input device, an issue-question directed to the selected topic; and
   (g) providing to the computer output device a plurality of answer-options to the selected issue-question, the plurality of answer-options comprising at least one expert opinion and one prudent-investor opinion and forming a response that is polycentric and tailored to said issue-question.

2. A method as recited by claim 1, wherein said step (a) comprises gathering data relating to personal finance and investment from a plurality of sources including survey data and focus group data and storing the gathered data in the memory storage device.

3. A method as recited by claim 1, wherein said step (b) comprises gathering data relating to personal finance and investment from a plurality of sources including survey data and focus group data and storing the gathered data in the memory storage device.

4. A method as recited by claim 1, wherein said step (c) comprises presenting each issue-question to an expert and storing the expert's answer in the memory storage device.

5. A method as recited by claim 1, wherein said step (d) comprises presenting each issue-question to a prudent-investor and storing the prudent-investor's answer in the memory storage device.

6. A method of providing a plurality of answer-options to an issue-question relating to personal investment and finance, said method comprising the steps of:
   (a) identifying a plurality of topics relating to personal investment and finance based upon predetermined criteria;
   (b) developing and recording a plurality of issue-questions directed to each of the identified personal investment and finance topics;
   (c) developing and recording an expert opinion for each issue-question;
   (d) developing and recording a prudent-investor opinion, said opinion being from persons having actual, hands-on, practical experience with specific financial issues, situations and investment issues, regardless of whether that person is actively and regularly engaged in investment matters, or maintains an active portfolio of investment properties, for each issue-question;
   (e) selecting a topic;
   (f) selecting an issue-question directed to the selected topic; and
   (g) communicating a plurality of answer-options to the selected issue-question, the plurality of answer-options comprising at least one expert opinion and one prudent-investor opinion and being communicated orally, in writing, or electronically, said answer-options providing a response that is polycentric and tailored to the issue-question.

7. A method as recited by claim 6, wherein said step (a) comprises gathering data relating to personal finance and investment from a plurality of sources including survey data and focus group data.

8. A method as recited by claim 6, wherein said step (b) comprises gathering data relating to personal investment and finance from a plurality of sources including survey data and focus group data.

9. A method as recited by claim 6, wherein said step (c) comprises presenting each issue-question to an expert.

10. A method as recited by claim 6, wherein said step (d) comprises presenting each issue-question to a prudent-investor.

11. A method as recited by claim 6, wherein said step (g) further comprises broadcasting the plurality of answer-options using a television medium.

12. A method as recited by claim 6, wherein said step (g) further comprises recording the plurality of answer-options on videotape.

13. A method as recited by claim 6, wherein said step (g) further comprises recording the plurality of answer-options on a DVD.

14. A method of providing to a user a polycentric information product concerning personal investment and finance, in a computer having a processor, an input device, a memory storage device and an output device, said method comprising the steps of:
   (a) developing and recording in a database on the memory storage device a first data set containing a plurality of topics relating to personal investment and finance;
   (b) developing and recording in said database a second data set containing a plurality of issue-questions directed to each of said topics;
   (c) developing and recording in said database a third data set containing an expert opinion for each issue-question;
   (d) developing and recording in said database a fourth data set containing a prudent-investor opinion, said opinion being from persons having actual, hands-on, practical experience with specific financial issues, situations and investment issues, regardless of whether that person is actively and regularly engaged in investment matters, or maintains an active portfolio of investment properties, for each issue-question;
   (e) selecting from said database, by the user via the input device, a topic;
   (f) selecting from said database, by the user via the input device, an issue-question pertinent to at least one selected topic, said selected topic and issue-question comprising a primary information product;
   (g) modifying said primary information product by imposing thereon a plurality of answer-options to the selected issue-question, the plurality of answer-options comprising at least one expert opinion and one prudent-investor opinion to thereby produce a polycentric information product tailored to said issue-question; and
   (h) communicating to the user via the computer output device said polycentric information product by oral, written or electronic means.

15. A method as recited by claim 14, wherein said step (a) comprises gathering data relating to personal finance and investment from a plurality of sources including survey data and focus group data and storing the gathered data in the memory storage device.

16. A method as recited by claim 14, wherein said step (b) comprises gathering data relating to personal investment and finance from a plurality of sources including survey data and focus group data and storing the gathered data in the memory storage device.

17. A method as recited by claim 14, wherein said step (c) comprises presenting each issue-question to an expert and storing the expert's answer in the memory storage device.

18. A method as recited by claim 14, wherein said step (d) comprises presenting each issue-question to a prudent-investor and storing the prudent-investor's answer in the memory storage device.

19. A method of providing to a user a plurality of answer-options comprised of an expert opinion and a prudent-investor opinion, said prudent-investor opinion being from persons having actual, hands-on, practical experience with specific financial issues, situations and investment issues, regardless of whether that person is actively and regularly engaged in investment matters, or maintains an active portfolio of investment properties, on an issue-question and relating to personal investment and finance, the answer-options, expert opinion, prudent-investor opinion, and issue-questions being stored in a memory storage device of a computer having a processor, an input device, and an output device, said method comprising the steps of:
   (a) selecting, by the user via the input device, a topic from a list of topics stored in the memory storage device;
   (b) constructing an input mask by entering, by the user via the input device, a variable criterion;
   (c) identifying a plurality of issue-questions that satisfy the variable criterion using the input mask;
   (d) identifying a plurality of answer-options to the identified issue-questions; and
   (e) providing to the computer output device the plurality of answer-options, said answer-options providing a response that is polycentric and tailored to said issue-question.

20. A method as recited by claim 19, wherein said step (b) comprises entering, by the user, information specific to the user including the user's investment preferences and geographic location.

21. A method as recited by claim 1, wherein a copy-editor evaluates each answer-option for content, and eliminates those answer-options with the same content, such that only answer-options which contain unique opinions are displayed to the user.

22. A method as recited by claim 1, wherein each answer-option is assigned a content code and wherein more than one answer-option has the same content code, only one of the answer-options with the same content code is selected for display to the user.

23. A method as recited by claim 1, further including the step of assigning a preference code to each answer-option.

24. A method as recited by claim 1, further including the step of asking the user a series of questions, designed to identify the user's preferences, and assigning to the user a preference code.

25. A method as recited by claim 1, further including the step of filtering the answer-options to the selected issue-question, to include only those answer-options coded with the user's preference code.

26. A method of providing to a user a plurality of answer-options to an issue-question relating to personal investment and finance, in a computer having a processor, an input device, a memory storage device and an output device, said method comprising the steps of:

(a) identifying and storing in the memory storage device a plurality of topics relating to personal investment and finance;

(b) developing and storing in the memory storage device a plurality of issue-questions directed to each of the stored topics;

(c) developing and storing in the memory storage device an expert opinion for each issue-question;

(d) selecting, by the user via the input device, a topic;

(e) selecting, by the user via the input device, an issue-question directed to the selected topic; and (f) providing to the computer output device a plurality of answer-options to the selected issue-question, the plurality of answer-options comprising a plurality of expert opinions that are substantially diverse and collectively produce a polycentric information product tailored to said issue-question.

27. A method as recited by claim 1, wherein each answer-option is assigned a content code and wherein more than one answer-option has the same content code, only one of the answer-options with the same content code is selected for display to the user.

* * * * *